United States Patent
Isokawa

(10) Patent No.: US 9,930,198 B2
(45) Date of Patent: Mar. 27, 2018

(54) IMAGE READING APPARATUS AND IMAGE FORMING SYSTEM

(71) Applicant: KONICA MINOLTA, INC., Chiyoda-ku, Tokyo (JP)

(72) Inventor: Hiroshi Isokawa, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/157,016

(22) Filed: May 17, 2016

(65) Prior Publication Data
US 2016/0366296 A1    Dec. 15, 2016

(30) Foreign Application Priority Data
Jun. 10, 2015  (JP) ................. 2015-117341

(51) Int. Cl.
| | | |
|---|---|---|
| H04N 1/00 | (2006.01) | |
| G06F 3/12 | (2006.01) | |
| G06K 15/02 | (2006.01) | |
| G03G 15/00 | (2006.01) | |

(52) U.S. Cl.
CPC ..... *H04N 1/00724* (2013.01); *G03G 15/6529* (2013.01); *H04N 1/0057* (2013.01); *H04N 1/00795* (2013.01)

(58) Field of Classification Search
None
See application file for complete search history.

(56) References Cited

U.S. PATENT DOCUMENTS

| | | | |
|---|---|---|---|
| 7,800,779 B2 | | 9/2010 | Fan et al. |
| 8,804,216 B2 * | | 8/2014 | Ito ................ G03G 15/5062 356/417 |
| 8,913,292 B2 | | 12/2014 | Ishizaki et al. |

(Continued)

FOREIGN PATENT DOCUMENTS

| | | | | |
|---|---|---|---|---|
| JP | 11069044 A | * | 3/1999 | ........ H04N 1/00 |
| JP | 2002-356259 | * | 12/2002 | ........ B65H 29/20 |

(Continued)

OTHER PUBLICATIONS

Japanese Office Action (and English translation thereof) dated May 16, 2017, issued in counterpart Japanese Application No. JP 2015-117341.

*Primary Examiner* — Beniyam Menberu
(74) *Attorney, Agent, or Firm* — Holtz Holtz & Volek PC

(57) ABSTRACT

An image reading apparatus and an image forming system which are hardly affected by noise due to paper dust or the like is provided. An image reading apparatus includes a back side image reading unit and a front side image reading unit which are continuously arranged in a sheet conveying direction. Also, an upstream side conveyance member and an intermediate conveyance member are arranged adjacent to each other in the upstream and downstream sides of the back side image reading unit. The intermediate conveyance member and the downstream side conveyance member are arranged adjacent to each other in the upstream and downstream sides of the front side image reading unit. The colorimetric unit is arranged outside an area from the upstream side conveyance member to the downstream side conveyance member in the sheet conveying direction.

18 Claims, 4 Drawing Sheets

(56) References Cited

U.S. PATENT DOCUMENTS

| | | | | |
|---|---|---|---|---|
| 9,372,127 | B1* | 6/2016 | Katerberg | G01L 1/241 347/16 |
| 2002/0178952 | A1* | 12/2002 | Sainio | B41F 33/0081 101/485 |
| 2004/0163562 | A1* | 8/2004 | Lewis, Jr. | B41F 33/0081 101/485 |
| 2005/0046889 | A1* | 3/2005 | Braudaway | G06K 9/036 358/1.14 |
| 2006/0239510 | A1* | 10/2006 | Tatarczyk | B41F 33/00 382/112 |
| 2009/0296091 | A1* | 12/2009 | Skinner | G01J 3/52 356/402 |
| 2012/0050786 | A1* | 3/2012 | Rudolph | G06F 3/1203 358/1.15 |
| 2013/0038657 | A1* | 2/2013 | Viturro | B41J 29/393 347/19 |
| 2013/0135636 | A1* | 5/2013 | Kosuge | G06K 15/027 358/1.9 |
| 2013/0136314 | A1* | 5/2013 | Yamakawa | B41J 3/44 382/112 |
| 2013/0182251 | A1* | 7/2013 | Shimbo | G01J 3/0208 356/302 |
| 2015/0350493 | A1* | 12/2015 | Sakatani | H04N 1/6052 358/504 |
| 2015/0358489 | A1* | 12/2015 | Isokawa | H04N 1/00087 358/474 |
| 2016/0062296 | A1* | 3/2016 | Nakamura | G03G 15/6558 399/15 |
| 2017/0223206 | A1* | 8/2017 | Katagiri | H04N 1/00588 |

FOREIGN PATENT DOCUMENTS

| | | | | |
|---|---|---|---|---|
| JP | 2007171967 | A | | 7/2007 |
| JP | 2010064422 | A | | 3/2010 |
| JP | 2012151631 | A | * | 8/2012 ............... H04N 1/04 |
| JP | 2014023112 | A | | 2/2014 |

* cited by examiner

IMAGE READING APPARATUS AND IMAGE FORMING SYSTEM

CROSS-REFERENCE TO RELATED APPLICATIONS

The present application claims priority under 35 U.S.C. § 119 to Japanese Patent Application No. 2015-117341, filed Jun. 10, 2015. The contents of this application are herein incorporated by reference in their entirety.

BACKGROUND OF THE INVENTION

Field of the Invention

The present invention relates to an image reading apparatus and an image forming system.

Description of Related Art

Heretofore, an image reading apparatus is known which reads a sheet output from an image forming apparatus, and feeds back this information to the image forming apparatus for the purpose of improving the image quality. This image reading apparatus is provided with an image reading unit which reads a sheet in the entire sheet width direction, for example, a line sensor consisting of imaging devices arranged in a line. The image reading unit reads a sheet conveyed in the system to generate image data. A control unit of the image reading apparatus then calculates the information for performing calibration to adjust the gradation characteristics of images, and adjusting the image positions between the front and back sides of a sheet and the magnification factor.

On the other hand, in recent years, an image reading apparatus is known which is provided further with a unit capable of measuring color information with a higher reliability than an image reading unit, e.g., a colorimetric unit which colorimetrically measure the absolute values of color, for adjusting the reading characteristics of the image reading unit. This image reading apparatus performs a process of comparing, of a sheet (specifically, a target image printed on the sheet), the color information read by the image reading unit with the color information colorimetrically measured by a colorimetric unit to associate the color information read by the image reading unit with the color information colorimetrically measured by the colorimetric unit. By this configuration, the reliability of the color information read by the image reading unit is improved, and therefore it is possible to feed back accurate information to the image forming apparatus. For example, Japanese Patent Published Application No. 2007-171967 discloses an image forming apparatus in which a spectrophotometer and a scanner are arranged in a document conveying path.

Incidentally, a colorimetric unit has a higher resolution of detecting color information than an image reading unit, and therefore, unlike an image reading unit, the detection range of a colorimetric unit does not cover the entirety of the sheet width direction, so that an image is measured on a spot within a limited detection range (view angle). For this reason, there is a problem that paper dust or the like can be attracted to the optical system during paper conveyance to have a great influence in detection accuracy.

Taking into consideration the above circumstances, it is an object of the present invention therefore to provide an image reading apparatus and an image forming system which are hardly affected by noise due to paper dust or the like.

SUMMARY OF THE INVENTION

To achieve at least one of the above-mentioned objects, reflecting one aspect of the present invention, an image reading apparatus comprises: a first conveyance member structured to convey a sheet; a first image reading unit arranged in a downstream side of the first conveyance member in a sheet conveying direction and structured to read the sheet which is conveyed; a second image reading unit arranged in a downstream side of the first image reading unit in the sheet conveying direction and structured to read the sheet which is conveyed; a second conveyance member arranged in a downstream side of the second image reading unit in the sheet conveying direction and structured to convey the sheet; and a colorimetric unit arranged outside an area from the first conveyance member to the second conveyance member and structured to colorimetric measure the sheet which is conveyed.

In accordance with the present invention as described above, it is preferred to further provide a third conveyance member arranged in the downstream side of the first image reading unit in the sheet conveying direction and in an upstream side of the second image reading unit in the sheet conveying direction and structured to covey the sheet. In this case, it is preferred that the first conveyance member and the third conveyance member are arranged adjacent to each other respectively in upstream and downstream sides of the first image reading unit which is located therebetween, and that the third conveyance member and the second conveyance member are arranged adjacent to each other respectively in the upstream and downstream sides of the second image reading unit which is located therebetween.

Also, in accordance with the present invention as described above, it is preferred that the first conveyance member, the second conveyance member and the third conveyance member are set up in order that the more downstream side in the sheet conveying direction the conveyance member is located in, the greater a speed of conveying a sheet is, and that the more upstream side in the sheet conveying direction the conveyance member is located in, the greater a force of conveying a sheet is.

Furthermore, in accordance with the present invention as described above, it is preferred that a conveying route in a downstream side of the second conveyance member in the sheet conveying direction consists of a linear segment which is linearly extending from the second conveyance member and a curved segment which is extending from the linear segment and curved. In this case, it is preferred that, in the case where the colorimetric unit is arranged in the downstream side of the second conveyance member in the sheet conveying direction, the colorimetric unit is arranged in an area from the second conveyance member to the curved segment.

Still further, in accordance with the present invention as described above, it is preferred that the colorimetric unit is arranged to face the sheet as a colorimetric measurement object from above.

Still further, in accordance with the present invention as described above, it is preferred that the colorimetric unit is arranged in such an area that the difference between a temperature of a sheet which is colorimetrically measured by the colorimetric unit and a temperature of a sheet which is read by the first image reading unit and the second image reading unit is within a predetermined range.

Still further, in accordance with the present invention as described above, it is preferred that the colorimetric unit is arranged in the area and apart from a neighboring heat source.

Still further, in accordance with the present invention as described above, it is preferred that the colorimetric unit is arranged in an area where a speed of conveying a sheet is constant.

Still further, in accordance with the present invention as described above, it is preferred that a conveying route between the first conveyance member and the third conveyance member is curved toward a background plate which is arranged opposite to the first image reading unit, and that a conveying route between the third conveyance member and the second conveyance member is curved toward a background plate which is arranged opposite to the second image reading unit.

DETAILED DESCRIPTION OF THE PREFERRED EMBODIMENT

Figure 1:
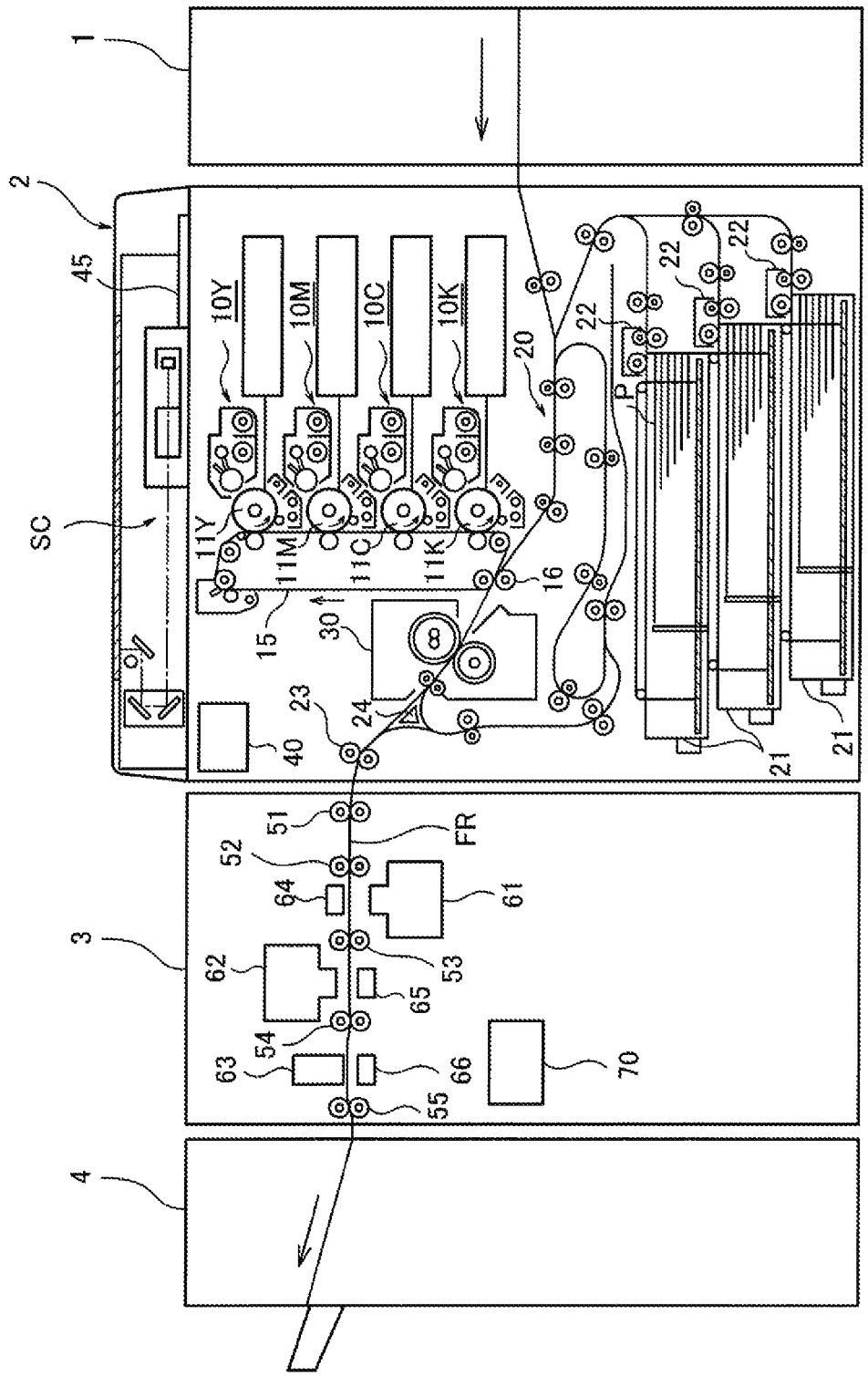
FIG. 1 is a view for schematically showing the configuration of an image forming system in accordance with a present embodiment.

FIG. 1 is a view for schematically showing the configuration of an image forming system in accordance with the present embodiment. The image forming system in accordance with the present embodiment includes a paper feed apparatus 1, an image forming apparatus 2, an image reading apparatus 3 and a finisher 4.

The paper feed apparatus 1 stores a large volume of sheets P and supplies the image forming apparatus 2 with the sheets P. The paper feed apparatus 1 is connected to the image forming apparatus 2 in the upstream side in the sheet conveying direction (the arrow direction in the figure). The paper feed apparatus 100 is provided, for example, with a plurality of paper feed trays each of which stores sheets P.

The image forming apparatus 2 is, for example, an electrophotographic image forming apparatus called a tandem color image forming apparatus which includes a plurality of photoreceptor drums vertically arranged in contact with one intermediate transfer belt to form full-color images. This image forming apparatus 2 consists mainly of an original reading units SC, four image forming units 10Y, 10M, 10C and 10K, a fixing unit 30, and a control unit 40.

The original reading unit SC irradiates the image of an original with an optical system of a lighting system, and reads the reflected light therefrom with a line image sensor to obtain image signals. The image signals are processed by performing A/D conversion, shading compensation, data compression and so on, and input to the control unit 40 as image data. Incidentally, the image data input to the control unit 40 is not limited to the image data as captured by the original reading unit SC, but can be the data for example as received from another image forming apparatus body, a personal computer or the like connected to the image forming apparatus body, or stored in a portable recording medium such as a semiconductor memory.

These four image forming units 10Y, 10M, 10C and 10K are an image forming unit 10Y for forming yellow (Y) images, an image forming unit 10M for forming magenta (M) images, an image forming unit 10C for forming cyan (C) images, and an image forming unit 10K for forming black (K) images.

The image forming unit 10Y consists of a photoreceptor drum 11Y which is provided therearound with a charging unit, an optical writing unit, a development apparatus, a drum cleaner and the like.

The photoreceptor drum 11Y is uniformly charged with electricity by the charging unit, and the optical writing unit perform a scanning exposure process to form latent images on the photoreceptor drum 11Y. The development apparatuse then makes visible the latent image on the photoreceptor drum 11Y by developing the image with toner. A predetermined color image (toner image) is thereby formed on the photoreceptor drum 11Y corresponding to yellow. The toner image formed on the photoreceptor drum 11Y is transferred to a predetermined location of an intermediate transfer belt 15 through a first transfer roller.

The image forming units 10M, 10C and 10K corresponding to the other color components have the same configuration as the image forming unit 10Y corresponding to yellow. While detailed description of these configurations are dispensed with, the description can be read by replacing the prefix "Y" attached to the reference of each constituent element with "M", "C" or "K".

After transferred to the intermediate transfer belt 15, the toner images are transferred by a second transfer roller 16 to a sheet P which is conveyed with a predetermined timing by a paper feed unit 20. The second transfer roller 16 is located in contact with the intermediate transfer belt 15 under pressure to form a nip portion therebetween.

The paper conveying unit 20 conveys sheets P which are fed from the paper feed apparatus 1 along a conveying route. There are a plurality of paper conveyance units in the conveying route for conveying sheets P. Each conveyance unit consists of a pair of rollers which are urged against each other. At least one of the pair of rollers is rotated by power supplied from a drive mechanism consisting of an electric motor.

Also, as illustrated in FIG. 1, the image forming apparatus 2 may be provided with one or more paper feed tray 21. Each paper feed tray 21 stores sheets P. The sheet P stored in the paper feed tray 21 is transferred to a conveying route by the paper feed unit 22.

The fixing unit 30 is an apparatus which performs a fixing process of fixing a transferred image on a sheet P. The fixing unit 30 consists, for example, of a pair of fixing rollers urged against each other to form a fixing nip portion therebetween, and a heater for heating the fixing rollers. This fixing unit 30 fixes a transferred image to a sheet P under the pressure applied between the pair of fixing rollers and the heat applied through the fixing rollers. After the fixing process, the sheet P is discharged outwards (to the image reading apparatus 3 in the case of the present embodiment) by discharging rollers 23.

In the case where an image is to be formed also on the back side of a sheet P, the sheet P with the image formed on the front side is conveyed to a refeed conveying route through a switching gate 24. The refeed conveying route includes reversing rollers which hold the tail end of the conveyed sheet P and then sends back the sheet P to reverse the front and back sides of the sheet P. After reversing the front and back sides, the sheet P is conveyed by a plurality of conveyance members and returned to a predetermined position of a conveying route for the purpose of supplying the sheet P to form an image on the other side.

The control unit 40 is responsible for integrally controlling the image forming apparatus 2 and can be implemented with a microcomputer mainly including a CPU, a ROM, a RAM, and an I/O interface. The control unit 40 forms an image on a sheet P by controlling the image forming units 10Y, 10M, 10C and 10K and the like.

In addition to this, the control unit 40 is consists of communicating the paper feed apparatus 1, the image reading apparatus 3 and the finisher 4 to generally control the entire image forming system through cooperation of these apparatuses.

The operation panel 45 is an input unit having a touch panel and a hardware keyboard through which information can be input in accordance with information displayed on a display. A user can input a variety of parameters such as information about a sheet P, the density and reduce/enlarge ratio of images and selection of a paper tray to be used as a paper supply source by operating the operation panel 45. The information input through the operation panel 45 is input to the control unit 40. On the other hand, the operation panel 45 functions also as a display unit which is part of the operation panel 45 through which the user can be informed of various items of information. The content displayed on the operation panel 45 (display) is controlled by the control unit 40.

The image reading apparatus 3 is located in the downstream side of the image forming apparatus 2 in the sheet conveying direction. After receiving a sheet P from the image forming apparatus 2, the image reading apparatus 3 reads this sheet P and perform various processes based on the image data which is the read image. For example, the image reading apparatus 3 calculates information for adjusting (calibrating) the gradation characteristics of images formed on the sheet P and aligning the images on the front and back sides, and feeds back this information to the image forming apparatus 2.

The image reading apparatus 3 consists mainly of a paper conveying unit, a back side image reading unit 61, a front side image reading unit 62, a colorimetric unit 63 and a control unit 70.

After receiving a sheet P from the image forming apparatus 2, the paper conveying unit conveys and discharges this sheet P outwards (to the finisher 4 in the case of the present embodiment). The paper conveying unit consists of a plurality of conveyance members arranged along a conveying route FR, and includes five conveyance members 51, 52, 53, 54 and 55 in the case of the present embodiment.

The conveying route FR of the present embodiment is implemented as a linear route in its entirety. The five conveyance members 51, 52, 53, 54 and 55 are the conveyance member 51, the conveyance member 52, the conveyance member 53, the conveyance member 54 and the conveyance member 55 which are arranged in this order from the upstream side to the downstream side in the sheet conveying direction. Each of the conveyance members 51, 52, 53, 54 and 55 consists of a pair of conveyance rollers which are urged against each other.

The conveyance member 51 is a conveyance member which is located in the most upstream side of the conveying route FR. This conveyance member 51 is responsible for receiving a sheet P output from the image forming apparatus 2, and outputs the sheet P to the downstream side of the conveying route FR.

The conveyance member 52 is one of the conveyance members arranged in the conveying route FR, and located in the downstream side of the conveyance member 51 in the case of the present embodiment. In what follows, this conveyance member 52 is referred to, if necessary, as "the upstream side conveyance member 52".

The conveyance member 53 is one of the conveyance members arranged in the conveying route FR, and located in the downstream side of the upstream side conveyance member 52 with a predetermined distance in between in the case of the present embodiment. In what follows, this conveyance member 53 is referred to, if necessary, as "the intermediate conveyance member 53".

The conveyance member 54 is one of the conveyance members arranged in the conveying route FR, and located in the downstream side of the intermediate conveyance member 53 with a predetermined distance in between in the case of the present embodiment. In what follows, this conveyance member 54 is referred to, if necessary, as "the downstream side conveyance member 54".

The conveyance member 55 is one of the conveyance members arranged in the conveying route FR, and located in the downstream side of the downstream side conveyance member 54 with a predetermined distance in between in the case of the present embodiment. In the case of the example shown in FIG. 1, the conveyance member 55 is located in the most downstream side of the conveying route FR, and responsible for discharging a sheet P conveyed along the conveying route FR to the finisher 4.

The back side image reading unit 61 reads the back side (specifically the image formed on the back side) of a sheet P conveyed along the conveying route FR (the first image reading unit). The back side image reading unit 61 is located between the upstream side conveyance member 52 and the intermediate conveyance member 53, and arranged below the conveying route FR in order to face the back side of a sheet P conveyed along the conveying route FR. Incidentally, in this description of the image reading apparatus 3, the front side of a sheet P is meant to be the upper surface of the sheet P conveyed in the image reading apparatus 3, and the back side is meant to be the lower surface opposite thereto. The front and back sides are thereby not necessarily corresponding to the main side (the surface on which an image is primarily printed) of the sheet P and the rear side (the surface on which an image is secondarily printed) respectively during image formation process.

The back side image reading unit 61 is an image scanner which consists mainly of a light source which radiates light to a sheet P which is conveyed and a line image sensor consisting for example of CCDs or CISs. The line image sensor consists of a plurality of elements which are linearly arranged in the sheet width direction (in the direction perpendicular to the sheet conveyance direction) to photoelectrically convert light in correspondence with picture elements respectively. The reading area of the back side image reading unit 61 has a predetermined width in the sheet width direction and is determined, for example, to cover the maximum width of a sheet P which is fed to the image reading apparatus 3. In synchronization with a sheet P which is being conveyed, the back side image reading unit 61 reads an image on a line-by-line basis in the sheet width direction to successively output image data. The image data output from the back side image reading unit 61 is output to the control unit 70. Two-dimensional image data corresponding to the read image of a sheet P is output to the control unit 70 by reading operation on the paper surface throughout in the sheet conveying direction.

In addition, a background plate 64 providing a read reference surface is arranged in an opposite position to the back side image reading unit 61 with the conveying route FR therebetween.

The front side image reading unit 62 reads the front side (specifically the image formed on the front side) of a sheet P conveyed along the conveying route FR (the second image reading unit). The front side image reading unit 62 is located in a position between the intermediate conveyance member 53 and the downstream side conveyance member 54, and arranged above the conveying route FR in order to face the front side of a sheet P conveyed along the conveying route FR.

The front side image reading unit 62 is an image scanner which consists mainly of a light source which radiates light to a sheet P which is conveyed and a line image sensor consisting for example of CCDs or CISs. The line image sensor consists of a plurality of elements which are linearly arranged in the sheet width direction to photoelectrically convert light in correspondence with picture elements respectively. The reading area of the front side image reading unit 62 has a predetermined width in the sheet width direction and is determined, for example, to cover the maximum width of a sheet P which is fed to the image reading apparatus 3. In synchronization with a sheet P which is being conveyed, the front side image reading unit 62 reads an image on a line-by-line basis in the sheet width direction to successively output image data. The image data output from the front side image reading unit 62 is output to the control unit 70. Two-dimensional image data corresponding to the read image of a sheet P is output to the control unit 70 by reading operation on the paper surface throughout in the sheet conveying direction.

In addition, a background plate 65 providing a read reference surface is arranged in an opposite position to the front side image reading unit 62 with the conveying route FR therebetween.

The colorimetric unit 63 colorimetrically measures a sheet P conveyed along the conveying route FR to obtain the color information of the sheet P (specifically the image formed on the sheet P). The colorimetric unit 63 is arranged in the downstream side of the downstream side conveyance member 54 in the vicinity of the front side image reading unit 62, and arranged above the conveying route FR in order to face the front surface of a sheet P conveyed along the conveying route FR.

The colorimetric unit 63 is for example a spectral colorimeter which measures the absolute values of color. The color information measured by the colorimetric unit 63 is represented in a predetermined color space such as the XYZ color model. In other words, the colorimetric unit 63 can measure color information with a higher degree of accuracy than the back side image reading unit 61 and the front side image reading unit 62. The colorimetry range (view angle) of the colorimetric unit 63 is set to be narrower than the reading range of the back side image reading unit 61 and the reading range of the front side image reading unit 62 to perform colorimetric measurement on a spot within the range of a predetermined view angle. In synchronization with a sheet P which is being conveyed, the colorimetric unit 63 colorimetrically measure an image on the sheet P. The colorimetric measurement result of the colorimetric unit 63 is generated as numeric values (colorimetric data) represented in a predetermined color model, and output to the control unit 70.

In addition, a background plate 66 providing a read reference surface is arranged in an opposite position to the colorimetric unit 63 with the conveying route FR therebetween.

The control unit 70 is responsible for integrally controlling the image reading apparatus 3 and can be implemented with a microcomputer mainly including a CPU, a ROM, a RAM, and an I/O interface.

The control unit 70 performs an arithmetic operation, as a first function, to obtain the information for performing calibration to adjust the gradation characteristics of images, and adjusting the image positions between the front and back sides of a sheet and the magnification factor based on the image data output from the back side image reading unit 61 and the front side image reading unit 62 respectively. This information is fed back from the control unit 70 to the image forming apparatus 2.

Also, the control unit 70 performs an arithmetic operation, as a second function, to obtain the information for colorimetrically measuring the image on a sheet with the colorimetric unit 63 and adjusting the reading characteristics of the back side image reading unit 61 and the front side image reading unit 62 based on the color information which is obtained by the colorimetric measurement. The process for performing this arithmetic operation is performed in an adjustment mode and instructed from the control unit 40 of the image forming apparatus 2 by a command of a user through the operation panel 45.

Specifically, the control unit 70 controls the back side image reading unit 61, the front side image reading unit 62 and the colorimetric unit 63 to operate in synchronization with conveyance of a sheet P on which is formed a predetermined image (for example, a patch image). The sheet P is thereby read with the back side image reading unit 61 and the front side image reading unit 62, and the image on the sheet P is colorimetrically measured with the colorimetric unit 63. The control unit 70 compares the color information obtained from the image data read by the back side image reading unit 61 and the front side image reading unit 62 with the color information colorimetrically measured by the colorimetric unit 63, and associates the color information obtained by the back side image reading unit 61 and the front side image reading unit 62 with the color information colorimetrically measured by the colorimetric unit 63. Thereby, with respect to the image data read by the back side image reading unit 61 and the front side image reading unit 62, the control unit 70 can feed back accurate color information to the image forming apparatus 2.

The finisher 4 is an apparatus which conveys a sheet P supplied from the image reading apparatus 3 and performs a post-printing process with the sheet P. The post-printing process is for example a folding process of folding a sheet P in various ways, a punching process of punching a sheet P, a bookbinding process of folding, saddle-stitching and trimming a plurality of sheets P, a staple process of stapling a plurality of sheets P together, or the like. The finisher 4 performs a predetermined post-printing process with a sheet P, or does not performs any post-printing process with the sheet P, and discharges the sheet P to a catch tray which is located outside the apparatus.

Figure 2:
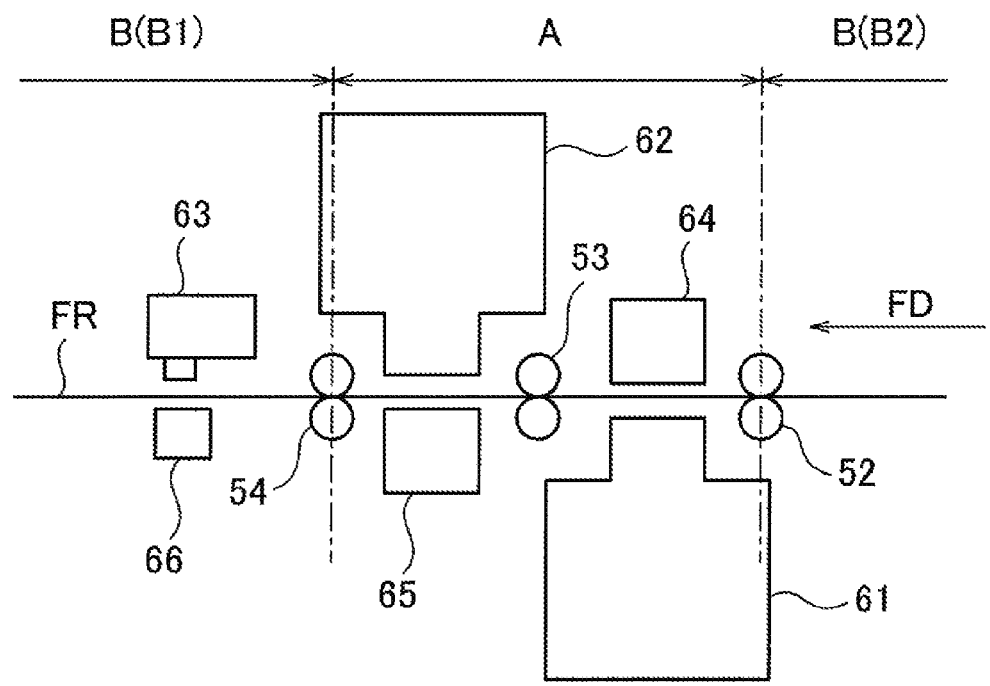
FIG. 2 is an explanatory view for schematically showing the configuration of the main portion of an image reading apparatus.

In what follows, the image reading apparatus 3 will be explained with reference to FIG. 2 in detail. FIG. 2 is an explanatory view for schematically showing the configuration of the main portion of the image reading apparatus 3.

Figure 3:
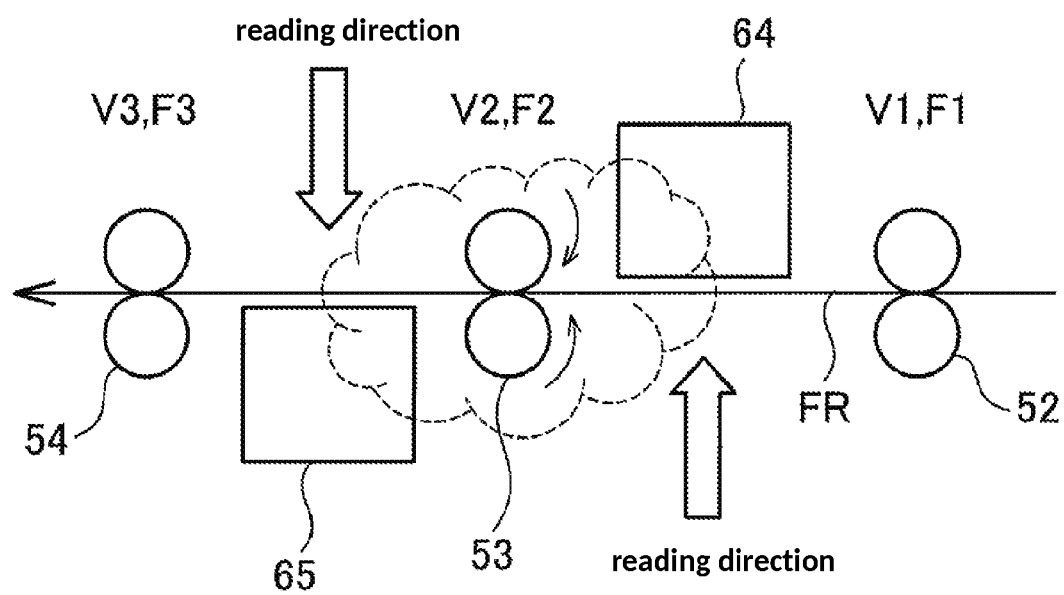
FIG. 3 is an explanatory view for conceptually showing the operations of upstream, intermediate and downstream side conveyance members.

FIG. 3 is an explanatory view for conceptually showing the operations of the upstream, intermediate and downstream side conveyance members 52, 53 and 54. In FIG. 2, "FD" indicates the sheet conveying direction.

In the case of the image reading apparatus 3 of the present embodiment, the back side image reading unit 61 and the front side image reading unit 62 are sequentially arranged along the sheet conveying direction FD in order to read the front and back sides of a sheet P at the same time by a single paper conveyance. Then, the upstream side conveyance member 52 and the intermediate conveyance member 53 are arranged adjacent to each other in the upstream and downstream sides of the back side image reading unit 61 respectively so that the reading position of the back side image reading unit 61 is located between the upstream side conveyance member 52 and the intermediate conveyance member 53. On the other hand, the intermediate conveyance member 53 and the downstream side conveyance member 54 are arranged adjacent to each other in the upstream and downstream sides of the front side image reading unit 62 respectively so that the reading position of the front side image reading unit 62 is located between the intermediate conveyance member 53 and the downstream side conveyance member 54.

In order to inhibit the height of a sheet P from varying in the reading position, with respect to the three conveyance members 52, 53 and 54, the speed and force of conveying the sheet P are determined to satisfy the following relationships.

$$V1<V2<V3 \text{ and } F1>F2>F3$$

In the above formulas, V1 is the speed of conveying a sheet P by the upstream side conveyance member 52, and V2 is the speed of conveying a sheet P by the intermediate conveyance member 53. Also, V3 is the speed of conveying a sheet P by the downstream side conveyance member 54. Furthermore, F1 is the force of the upstream side conveyance member 52 to convey a sheet P, F2 is the force of the intermediate conveyance member 53 to convey a sheet P. Also, F3 is the force of the downstream side conveyance member 54 to convey a sheet P. In this case, the conveying speed of the sheet P can be adjusted by adjusting the rotational speed of the pair of rollers forming the conveyance member, and the force of conveying a sheet P can be adjusted by adjusting the nipping pressure of the pair of rollers and the friction coefficient of the roller surfaces.

Namely, the conveying speeds V1, V2 and V3 of the three conveyance members 52, 53 and 54 are set up such that the more downstream side in the sheet conveying direction FD the conveyance member is located in, the greater the speed of conveying a sheet P is. On the other hand, the conveying forces F1, F2 and F3 of the three conveyance members 52, 53 and 54 are set up such that the more upstream side in the sheet conveying direction FD the conveyance member is located in, the greater the force of conveying a sheet P is.

By this determination, a tension is given to a sheet P between the upstream side conveyance member 52 and the intermediate conveyance member 53 to inhibit the height of the sheet P from varying in the reading position. Likewise, a tension is given to a sheet P between the intermediate conveyance member 53 and the downstream side conveyance member 54 to inhibit the height of the sheet P from varying in the reading position.

Incidentally, in accordance with this determination, a sheet P slips on the conveyance members 53 and 54 located in the downstream side of the upstream side conveyance member 52 for the purpose of giving a tension to the sheet P. In this case, the upstream side conveyance member 52 conveys a sheet P at its own speed so that the sheet P does not slip on the upstream side conveyance member 52. Accordingly, no paper dust is generated by the upstream side conveyance member 52. On the other hand, the downstream side conveyance member 54 slips on a sheet P for the purpose of giving a tension to the intermediate conveyance member 53. However, the downstream side conveyance member 54 has a smaller conveying force F3 so that, while slipping on the sheet P, little paper dust is generated.

The intermediate conveyance member 53 slips on a sheet P in relation to the upstream side conveyance member 52 for the purpose of giving a tension. On the other hand, the intermediate conveyance member 53 provides a base speed with respect to the downstream side conveyance member 54, and thereby has a predetermined conveying force F2. Because of this, while maintaining the predetermined conveying force, the intermediate conveyance member 53 slips so that the slipping in this situation can cause generation of paper dust.

The intermediate conveyance member 53 causes paper dust generation in this manner, and thereby the area from the upstream side conveyance member 52 to the downstream side conveyance member 54 provides an environment where paper dust tends to scatter.

The image reading apparatus 3 of the present embodiment thereby has the colorimetric unit 63 arranged in the following condition. Specifically, there are defined in the sheet conveying direction FD an area A extending from the upstream side conveyance member 52 to the downstream side conveyance member 54, and an area B outside the area A. The colorimetric unit 63 is arranged in the area B of these areas A and B. In other words, the area A is set as an inhibition area in which installation of the colorimetric unit 63 is inhibited.

On the other hand, the area B is divided into a B1 area in the downstream side of the downstream side conveyance member 54 and a B2 area in the upstream side of the upstream side conveyance member 52. The colorimetric unit 63 is arranged in the B1 area of the B area which is located in the downstream side as seen from the image forming apparatus 2, particularly, in the vicinity of the front side image reading unit 62 in the B1 area.

Figure 4A:
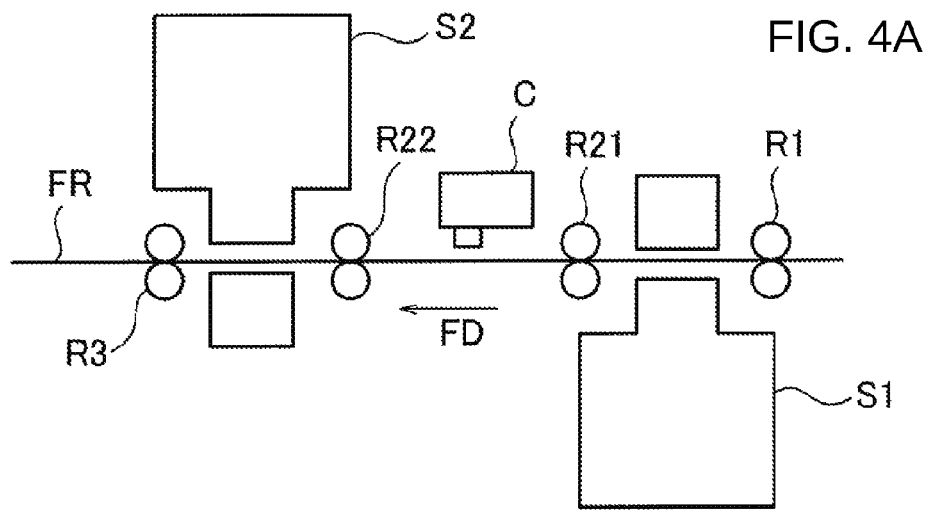
FIG. 4A through FIG. 4C are explanatory views for showing various arrangements of a colorimetric unit.
Figure 4B:
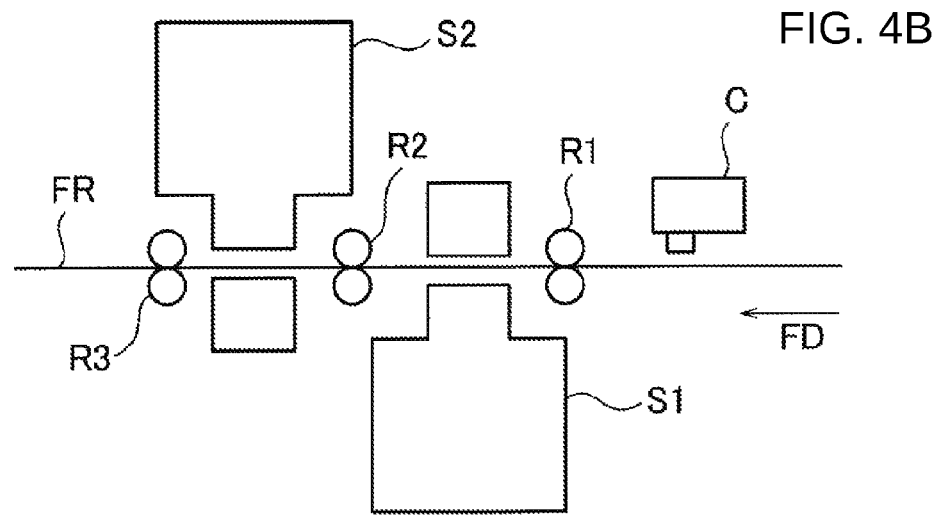
Figure 4C:
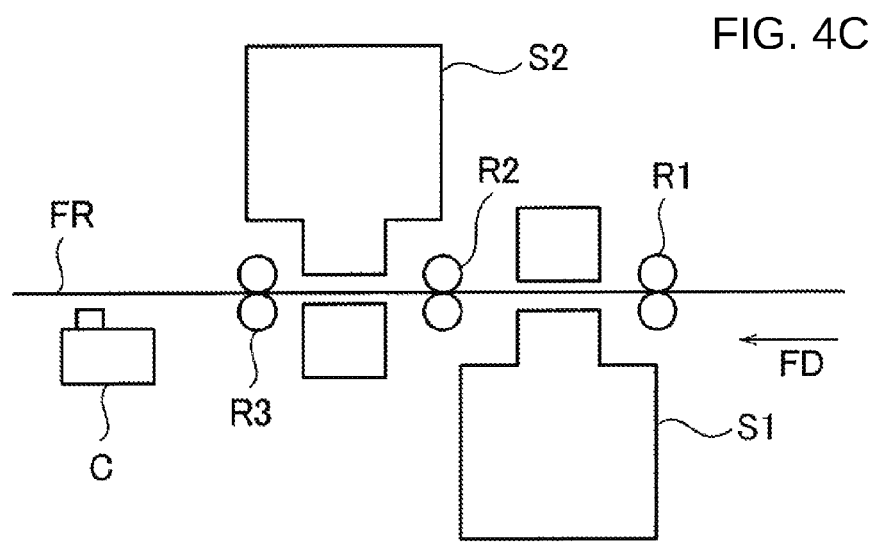

In what follows, various arrangements of the colorimetric unit and the characteristics thereof will be explained with respect to FIG. 4A through FIG. 4C. FIG. 4A through FIG. 4C are explanatory views for showing various arrangements of the colorimetric unit. In the same figure, "S1" indicates a back side image reading unit, "S2" indicates a front side image reading unit, and "C" indicates a colorimetric unit. Also, "R1" indicates an upstream side conveyance member, "R2", "R21" and "R22" indicate intermediate conveyance members respectively, and "R3" indicates a downstream side conveyance member.

FIG. 4A is an explanatory view for showing a first arrangement of the colorimetric unit C. As shown in this figure, the back side image reading unit S1 and the front side image reading unit S2 are sequentially arranged along the sheet conveying direction FD. In this case, the upstream side conveyance member R1 is arranged in the upstream side of the back side image reading unit S1, and the first intermediate conveyance member R21 is arranged in the downstream side of the back side image reading unit S1. Also, the second intermediate conveyance member R22 is arranged in the upstream side of the front side image reading unit S2, and the downstream side conveyance member R3 is arranged in the downstream side of the back side image reading unit S1. On the other hand, the colorimetric unit C is arranged in the downstream side of the first intermediate conveyance member R21 and in the upstream side of the second intermediate conveyance member R22.

In this arrangement, with respect to the back side image reading unit S1, a tension is given to a sheet P by the upstream side conveyance member R1 and the first intermediate conveyance member R21. The speed of conveying a sheet P by the first intermediate conveyance member R21 is set to be greater than that of the upstream side conveyance member R1, and the force of conveying a sheet P by the first intermediate conveyance member R21 is set to be smaller than that of the upstream side conveyance member R1.

On the other hand, with respect to the front side image reading unit S2, a tension is given to a sheet P by the second intermediate conveyance member R22 and the downstream side conveyance member R3. Namely, the speed of conveying a sheet P by the downstream side conveyance member R3 is set to be greater than that of the second intermediate conveyance member R22, and the force of conveying a sheet P by the downstream side conveyance member R3 is set to be smaller than that of the second intermediate conveyance member R22.

In this case, the conveyance members R21 and R3 located in the downstream side of the image reading units S1 and S2 respectively are provided only for giving a tension to a sheet P, so that the conveying forces thereof need not be large. Accordingly, even though the conveyance members R21 and R3 slip, no paper dust is generated.

On the other hand, between the first intermediate conveyance member R21 and the second intermediate conveyance member R22, there is concern of causing unstable behavior of a sheet P such as warping. Because of this, there is the possibility that the height of a sheet P varies to lower the accuracy of the colorimetric measurement by the colorimetric unit C.

As a result, while reducing the influence of paper dust, this arrangement tends to lower the accuracy of the colorimetric measurement under the influence of the unstable behavior of a sheet P.

FIG. 4B is an explanatory view for showing a second arrangement of the colorimetric unit C. This second arrangement is similar to that of the image reading apparatus 3 of the present embodiment except that the colorimetric unit C is located in the upstream side of the upstream side conveyance member R1. Since the colorimetric unit C is located in the upstream side of the upstream side conveyance member R1, as has been discussed above, the colorimetric unit C is inhibited from being affected by paper dust.

However, the colorimetric unit C is located in the upstream side of the conveying route FR, i.e., in the paper introduction side of sheets P to the image reading apparatus 3. In the case where the speed of conveying a sheet P set at the upstream side apparatus (the image forming apparatus 2) differs from the speed of conveying a sheet P set at the image reading apparatus 3 (i.e., the reading speed required for reading images), these conveying speeds are increased or decreased to match each other in the upstream side of the conveying route FR. The speed of conveying a sheet P thereby tends to fluctuate in the upstream side of the conveying route FR so that the accuracy of the colorimetric measurement by the colorimetric unit C may be lowered. In order to avoid this problem, the conveying route FR has to be elongated to finish the acceleration or deceleration of the conveying speed before a sheet arrives the colorimetric unit C.

In addition, since the upstream side of the conveying route FR is close to the fixing unit 30 of the image forming apparatus 2 which is located in the upstream side of the image reading apparatus 3, the upstream side of the conveying route FR is prone to heat generated by the fixing unit 30 (heat source). Furthermore, just after discharged from the image forming apparatus 2, a sheet P contains substantial heat which is generated by fixing process. While the temperature of the sheet P tends to moderate as the sheet P advances on the conveying route FR, the sheet temperature significantly varies in the upstream side of the conveying route FR. When the sheet temperature varies during colorimetric measurement, color tones change due to diminishing of thermochromism so that the accuracy of colorimetric measurement of the colorimetric unit C may be lowered.

Accordingly, while this arrangement is little affected by paper dust, the accuracy of colorimetric measurement tends to be lowered due to the influence of the conveying speed of a sheet P and the heat source.

FIG. 4C is an explanatory view for showing a third arrangement of the colorimetric unit C. This second arrangement is similar to that of the image reading apparatus 3 of the present embodiment except that the colorimetric unit C is arranged in the downward direction of the conveying route FR in order to face the back side of a sheet P which is conveyed. In this arrangement, since the colorimetric unit C is located in the downstream side of the downstream side conveyance member R3, the colorimetric unit C is inhibited from being affected by paper dust as has been discussed above.

However, since the colorimetric measurement surface of the colorimetric unit C faces up, there is a problem that paper dust tends to be piled on this colorimetric measurement surface. Because of this, while the influence of paper dust from the intermediate conveyance member R2 is small, airborne paper dust in the apparatus tends to be gradually accumulated on the colorimetric measurement surface so that the accuracy of colorimetric measurement of the colorimetric unit C may be lowered. In order to avoid such a situation, an openable and closable shutter can be provided between the colorimetric unit C and the conveying route FR in order to open the shutter only during colorimetric measurement. Even if such a structure is employed, it is difficult to completely prevent airborne paper dust and debris.

In this regard, as illustrated in FIG. 2, the colorimetric unit 63 of the present embodiment is arranged outside the area A extending from the upstream side conveyance member 52 to the downstream side conveyance member 54 in the sheet conveying direction By this configuration, the colorimetric unit 63 is located in the outside of the area where paper dust is generated. It is therefore possible to inhibit paper dust generated by paper conveyance from being attached to the colorimetric unit 63 and lowering the accuracy of colorimetric measurement. The colorimetric measurement by the colorimetric unit 63 can thereby be performed with a high degree of accuracy.

Also, in the case of the present embodiment, there is further provided the intermediate conveyance member 53 located in the downstream side of the back side image reading unit 61 and in the upstream side of the front side image reading unit 62. In this case, while the upstream side conveyance member 52 and the intermediate conveyance member 53 are arranged adjacent to each other with the back side image reading unit 61 therebetween, the intermediate conveyance member 53 and the downstream side conveyance member 54 are arranged adjacent to each other with the front side image reading unit 62 therebetween.

Furthermore, of the upstream side conveyance member 52, the intermediate conveyance member 53 and the downstream side conveyance member 54 of the present embodiment, the more downstream side in the sheet conveying direction FD the conveyance member is located in, the greater the speed of conveying a sheet P is, and the more upstream side in the sheet conveying direction FD the conveyance member is located in, the greater the force of conveying a sheet P is.

With this configuration, while the intermediate conveyance member 53 may cause generation of paper dust by giving a tension to a sheet P in accordance with the image reading unit 61 and 62, the colorimetric unit 63 is located apart from the intermediate conveyance member 53. It is therefore possible to inhibit paper dust generated by paper conveyance from being attached to the colorimetric unit 63 and lowering the accuracy of colorimetric measurement.

Furthermore, in the case of the present embodiment, the colorimetric unit 63 is arranged to face a sheet P which is the colorimetric measurement object from above.

With this configuration, since the colorimetric measurement surface of the colorimetric unit 63 faces down, it is possible to inhibit paper dust from being piled on this colorimetric measurement surface. It is thereby possible to inhibit paper dust generated by the intermediate conveyance member 53 from being piled on the colorimetric measurement surface so that the accuracy of colorimetric measurement of the colorimetric unit 63 is lowered.

Also, the colorimetric unit 63 of the present embodiment is arranged in the vicinity of the front side image reading unit 62. This can satisfy the relationship that the difference between the temperature of a sheet which is colorimetrically measured by the colorimetric unit 63 and the temperature of a sheet which is read by the back side image reading unit 61 and the front side image reading unit 62 is within a predetermined range.

By this configuration, it is possible to match the temperature of a sheet which is colorimetrically measured by the colorimetric unit 63 and the temperature of a sheet which is read by the back side image reading unit 61 and the front side image reading unit 62. It is therefore possible to inhibit color tone variation associated with paper temperature variation through the respective environments. As a result, the reading characteristics of the back side image reading unit 61 and the front side image reading unit 62 can be adjusted by the colorimetric unit 63 in an appropriate manner Also, the colorimetric unit 63 of the present embodiment is arranged in the B1 area which is located in the downstream side of the downstream side conveyance member 54.

In this arrangement, the colorimetric unit 63 is located apart from a neighboring heat source, i.e., the fixing unit 30 of the image forming apparatus 2. The colorimetric unit 63 is hardly affected by the heat source, and capable of performing colorimetrically measurement in an area where the paper temperature is stabilized. It is therefore possible to match the paper temperature in the colorimetrically measurement environment and the paper temperature in the reading environment. As a result, it is possible to inhibit color tone variation associated with paper temperature variation through the respective environments. Accordingly, the reading characteristics of the back side image reading unit 61 and the front side image reading unit 62 can be adjusted by the colorimetric unit 63.

Also, the colorimetric unit 63 of the present embodiment is arranged in the B1 area which is located in the downstream side of the downstream side conveyance member 54. In this arrangement, the colorimetric unit 63 is arranged in an area where the speed of conveying a sheet P is constant. As a result, it is possible to inhibit the accuracy of colorimetric measurement associated with variation of the speed of conveying a sheet P from being lowered.

Incidentally, while the above embodiment has been explained with the conveying route FR which is linear, the conveying route FR can be in the following configuration.

Figure 5:
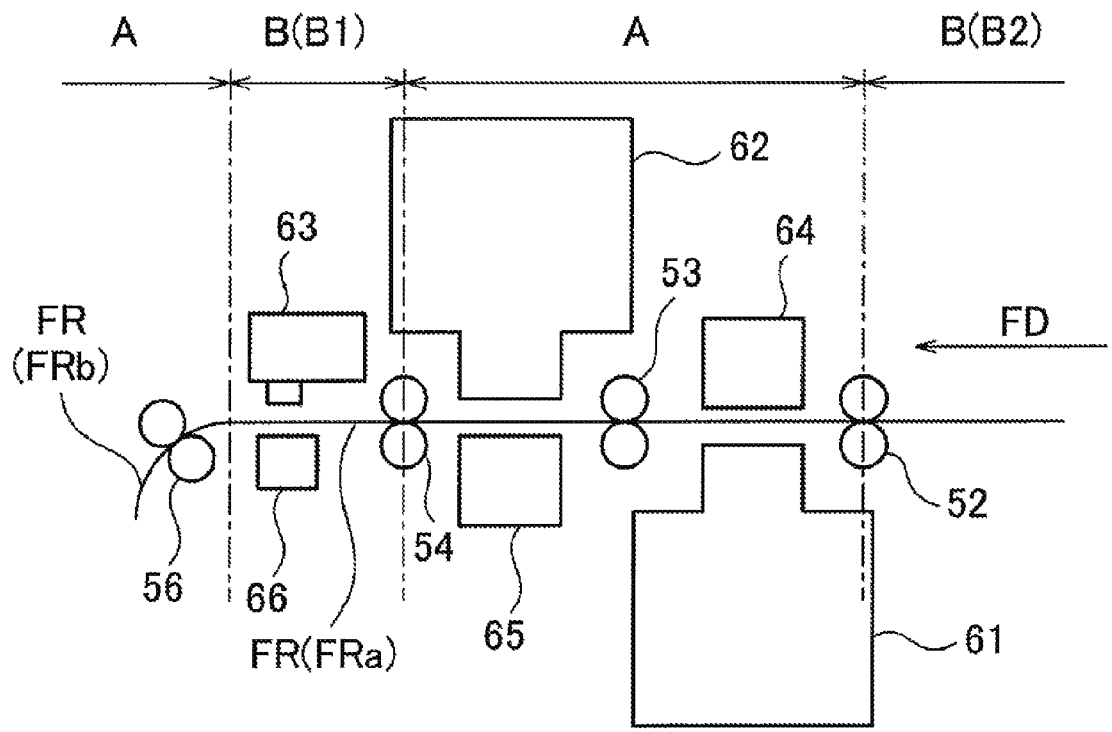
FIG. 5 is a view for explaining the conveying route in the downstream side of the downstream side conveyance member.

FIG. 5 is a view for explaining the conveying route FR in the downstream side of the downstream side conveyance member 54. In the structure as shown in the same figure, the conveying route FR in the downstream side of the downstream side conveyance member 54 consists of a linear segment FRa which is linearly extending from the downstream side conveyance member 54 and a curved segment FRb which is extending from the linear segment FRa and curved. In the conveying route FR which is fashioned in this manner, if the colorimetric unit 63 is arranged in the downstream side of the downstream side conveyance member 54, the colorimetric unit 63 is preferably arranged in the B1 area extending from the downstream side conveyance member 54 to the curved segment FRb. This is because paper dust can be generated by a sheet P which is chafing a guide member or the like during passing the curved segment FRb.

The influence of paper dust on the colorimetric unit 63 can thereby be inhibited by arranging the colorimetric unit 63 in the B1 area extending from the downstream side conveyance member 54 to the curved segment FRb (i.e., in the area corresponding to the linear segment FRa). In other words, in this arrangement, the area from the upstream side conveyance member 52 to the downstream side conveyance member 54 and the area in the downstream side of the curved segment FRb are set as inhibition areas (A areas) in which installation of the colorimetric unit 63 is inhibited.

Figure 6:
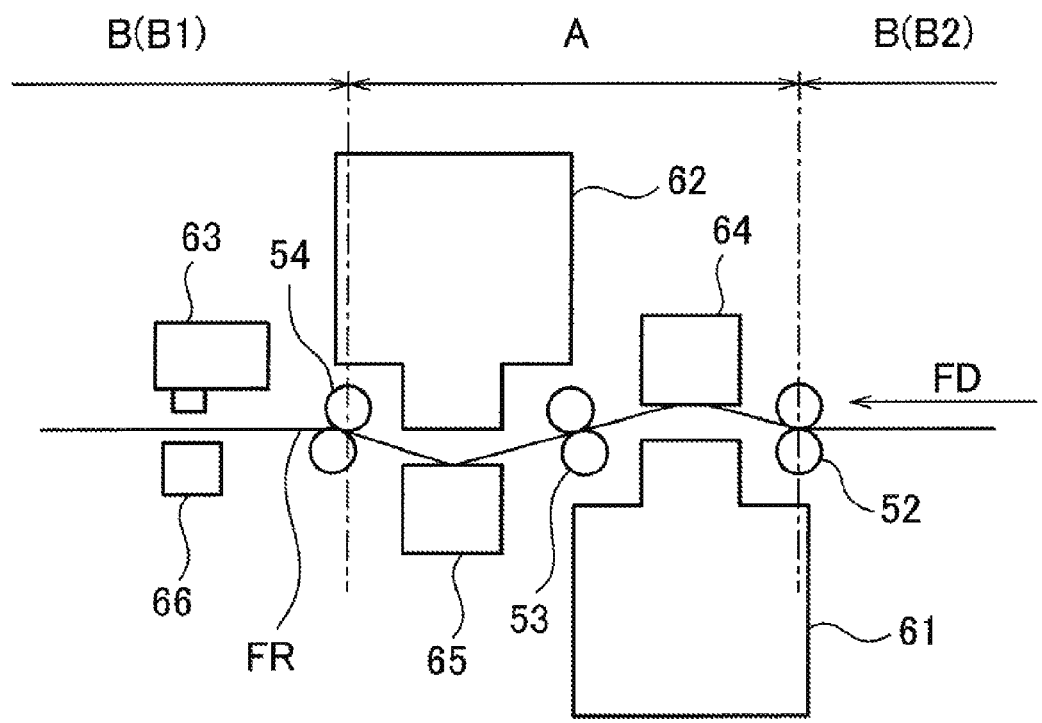
FIG. 6 is a view for explaining a conveying route of the image reading apparatus.

FIG. 6 is a view for explaining the conveying route FR of the image reading apparatus 3. In this arrangement shown in FIG. 6, the conveying route FR between the upstream side conveyance member 52 and the intermediate conveyance member 53 is curved toward the background plate 64 which is arranged opposite to the back side image reading unit 61. On the other hand, the conveying route FR between the intermediate conveyance member 53 and the downstream side conveyance member 54 is curved toward the background plate 65 which is arranged opposite to the front side image reading unit 62.

Also in this arrangement, the colorimetric unit 63 is arranged outside the area from the upstream side conveyance member 52 to the downstream side conveyance member 54 (the area A). It is therefore possible to inhibit paper dust generated by paper conveyance from being attached to the colorimetric unit 63 and lowering the accuracy of colorimetric measurement. As a result, the colorimetric measurement by the colorimetric unit 63 can be performed with a high degree of accuracy.

Furthermore, in accordance with the arrangement shown in the same figure, the height of a sheet P can be restricted from varying by curving the sheet P toward the background plates 64 and 65. The reading accuracy of the back side image reading unit 61 and the front side image reading unit 62 can thereby be inhibited from lowered.

The foregoing description has been presented based on the image forming system according to the present invention. However, it is not intended to limit the present invention to the precise form described, and obviously many modifications and variations are possible within the scope of the invention. The present invention can be considered to relate also to the image reading apparatus itself as a part of the image forming system. Also, while the control units of the apparatuses cooperate to perform the processes in the case of the present embodiment, these control units can be integrated as the control unit of the image forming apparatus serving to perform the processes of these control units, or a separate control apparatus can be provided for performing the above processes respectively which are explained in conjunction with the present embodiment.

What is claimed is:

1. An image reading apparatus comprising:
   a first conveyance member structured to convey a sheet;
   a first image scanner arranged on a downstream side of the first conveyance member in a sheet conveying direction and structured to read the sheet which is conveyed;
   a second image scanner arranged on a downstream side of the first image scanner in the sheet conveying direction and structured to read the sheet which is conveyed;
   a second conveyance member arranged on a downstream side of the second image scanner in the sheet conveying direction and structured to convey the sheet;
   a third conveyance member arranged on the downstream side of the first image scanner in the sheet conveying direction and on an upstream side of the second image scanner in the sheet conveying direction, and which is structured to convey the sheet; and
   a colorimeter which is arranged outside an area from the first conveyance member to the second conveyance member and structured to perform colorimetric measurement of the sheet which is conveyed;
   wherein:
   the first conveyance member and the third conveyance member are arranged adjacent to each other respectively on an upstream side and the downstream side of the first image scanner which is located therebetween;
   the third conveyance member and the second conveyance member are arranged adjacent to each other respectively on the upstream side and the downstream side of the second image scanner which is located therebetween;
   the first conveyance member, the second conveyance member and the third conveyance member are set up such that the more downstream in the sheet conveying direction the conveyance member is located, the greater a speed of conveying the sheet is, and such that the more upstream in the sheet conveying direction the conveyance member is located in, the greater a force of conveying the sheet is, whereby (i) the first conveyance member conveys the sheet with a lesser speed and a greater force than the second conveyance member and the third conveyance member, (ii) the third conveyance member conveys the sheet with a greater speed and a lesser force than the first conveyance member and a lesser speed and a greater force than the second conveyance member, and (iii) the second conveyance member conveys the sheet with a greater speed and a lesser force than the first conveyance member and the third conveyance member; and
   each of the first conveyance member, the second conveyance member, and the third conveyance member comprises a pair of pressure rollers.

2. The image reading apparatus of claim 1, wherein:
   a conveying route on a downstream side of the second conveyance member in the sheet conveying direction consists of a linear segment which is linearly extending from the second conveyance member and a curved segment which is extending from the linear segment and curved, and the colorimeter is arranged on the downstream side of the second conveyance member in the sheet conveying direction, in an area from the second conveyance member to the curved segment.

3. The image reading apparatus of claim 1, wherein the colorimeter is arranged to face the sheet as a colorimetric measurement object from above.

4. The image reading apparatus of claim 1, wherein the colorimeter is arranged in such an area that a difference between a temperature of a sheet which is colorimetrically measured by the colorimeter and a temperature of a sheet which is read by the first image scanner and the second image scanner is within a predetermined range.

5. The image reading apparatus of claim 4, wherein the colorimeter is arranged in said area and apart from a neighboring heat source.

6. The image reading apparatus of claim 1, wherein the colorimeter is arranged in an area where a speed of conveying a sheet is constant.

7. The image reading apparatus of claim 1, wherein:
   a conveying route between the first conveyance member and the third conveyance member is curved toward a background plate which is arranged opposite to the first image scanner, and
   a conveying route between the third conveyance member and the second conveyance member is curved toward a background plate which is arranged opposite to the second image scanner.

8. The image reading apparatus of claim 1, wherein the first image scanner is arranged to face the sheet from a lower side and read an image on a back side of the sheet, and the second image scanner is arranged to face the sheet from an upper side and read an image on a front side of the sheet.

9. An image reading apparatus comprising:
   a first conveyance member structured to convey a sheet;
   a first image scanner arranged on a downstream side of the first conveyance member in a sheet conveying direction and structured to read the sheet which is conveyed;
   a second image scanner arranged on a downstream side of the first image scanner in the sheet conveying direction and structured to read the sheet which is conveyed;
   a second conveyance member arranged on a downstream side of the second image scanner in the sheet conveying direction and structured to convey the sheet;
   a third conveyance member arranged on the downstream side of the first image scanner in the sheet conveying direction and on an upstream side of the second image scanner in the sheet conveying direction, and which is structured to convey the sheet; and
   a colorimeter structured to perform colorimetric measurement of the sheet which is conveyed,
   wherein:
   an area from the first conveyance member to the second conveyance member is set as an inhibition area in which installation of the colorimeter is inhibited;
   the first conveyance member and the third conveyance member are arranged adjacent to each other respectively on an upstream side and the downstream side of the first image scanner which is located therebetween;
   the third conveyance member and the second conveyance member are arranged adjacent to each other respectively on the upstream side and the downstream side of the second image scanner which is located therebetween;
   the first conveyance member, the second conveyance member and the third conveyance member are set up such that the more downstream in the sheet conveying direction the conveyance member is located, the greater a speed of conveying the sheet is, and such that the more upstream in the sheet conveying direction the conveyance member is located in, the greater a force of conveying the sheet is, whereby (i) the first conveyance member conveys the sheet with a lesser speed and a greater force than the second conveyance member and the third conveyance member, (ii) the third conveyance member conveys the sheet with a greater speed and a lesser force than the first conveyance member and a lesser speed and a greater force than the second conveyance member, and (iii) the second conveyance member conveys the sheet with a greater speed and a lesser force than the first conveyance member and the third conveyance member; and each of the first conveyance member, the second conveyance member, and the third conveyance member comprises a pair of pressure rollers.

10. An image forming system comprising:
an image forming apparatus structured to form an image on a sheet; and
an image reading apparatus structured to receive the sheet on which the image is formed,
wherein the image reading apparatus comprises:
a first conveyance member structured to convey a sheet;
a first image scanner arranged on a downstream side of the first conveyance member in a sheet conveying direction and structured to read the sheet which is conveyed;
a second image scanner arranged on a downstream side of the first image scanner in the sheet conveying direction and structured to read the sheet which is conveyed;
a second conveyance member arranged on a downstream side of the second image scanner in the sheet conveying direction and structured to convey the sheet;
a third conveyance member arranged on the downstream side of the first image scanner in the sheet conveying direction and on an upstream side of the second image scanner in the sheet conveying direction, and which is structured to convey the sheet; and
a colorimeter arranged outside an area from the first conveyance member to the second conveyance member and structured to perform colorimetric measurement of the sheet which is conveyed; and wherein:
the first conveyance member and the third conveyance member are arranged adjacent to each other respectively on an upstream side and the downstream side of the first image scanner which is located therebetween;
the third conveyance member and the second conveyance member are arranged adjacent to each other respectively on the upstream side and the downstream side of the second image scanner which is located therebetween;
the first conveyance member, the second conveyance member and the third conveyance member are set up such that the more downstream in the sheet conveying direction the conveyance member is located, the greater a speed of conveying the sheet is, and such that the more upstream in the sheet conveying direction the conveyance member is located in, the greater a force of conveying the sheet is, whereby (i) the first conveyance member conveys the sheet with a lesser speed and a greater force than the second conveyance member and the third conveyance member, (ii) the third conveyance member conveys the sheet with a greater speed and a lesser force than the first conveyance member and a lesser speed and a greater force than the second conveyance member, and (iii) the second conveyance member conveys the sheet with a greater speed and a lesser force than the first conveyance member and the third conveyance member; and each of the first conveyance member, the second conveyance member, and the third conveyance member comprises a pair of pressure rollers.

11. The image forming system of claim 10, wherein:
a conveying route on a downstream side of the second conveyance member in the sheet conveying direction consists of a linear segment which is linearly extending from the second conveyance member and a curved segment which is extending from the linear segment and curved, and
the colorimeter is arranged on the downstream side of the second conveyance member in the sheet conveying direction, in an area from the second conveyance member to the curved segment.

12. The image forming system of claim 10, wherein the colorimeter is arranged to face the sheet as a colorimetric measurement object from above.

13. The image forming system of claim 10, wherein the colorimeter is arranged in such an area that a difference between a temperature of a sheet which is colorimetrically measured by the colorimeter and a temperature of a sheet which is read by the first image scanner and the second image scanner is within a predetermined range.

14. The image forming system of claim 13, wherein the colorimeter is arranged in the area and apart from a neighboring heat source.

15. The image forming system of claim 10, wherein the colorimeter is arranged in an area where a speed of conveying a sheet is constant.

16. The image forming system of claim 10, wherein:
a conveying route between the first conveyance member and the third conveyance member is curved toward a background plate which is arranged opposite to the first image scanner, and
a conveying route between the third conveyance member and the second conveyance member is curved toward a background plate which is arranged opposite to the second image scanner.

17. The image forming system of claim 10, wherein the first image scanner is arranged to face the sheet from a lower side and read an image on a back side of the sheet, and the second image scanner is arranged to face the sheet from an upper side and read an image on a front side of the sheet.

18. An image forming system comprising:
an image forming apparatus structured to form an image on a sheet; and
an image reading apparatus structured to receive the sheet on which the image is formed,
wherein the image reading apparatus comprises:
a first conveyance member structured to convey a sheet;
a first image scanner arranged on a downstream side of the first conveyance member in a sheet conveying direction and structured to read the sheet which is conveyed;
a second image scanner arranged on a downstream side of the first image scanner in the sheet conveying direction and structured to read the sheet which is conveyed;
a second conveyance member arranged on a downstream side of the second image scanner in the sheet conveying direction and structured to convey the sheet;
a third conveyance member arranged on the downstream side of the first image scanner in the sheet conveying direction and on an upstream side of the second image scanner in the sheet conveying direction, and which is structured to convey the sheet; and a colorimeter structured to perform colorimetric measurement of the sheet which is conveyed, and wherein:

an area from the first conveyance member to the second conveyance member is set as an inhibition area in which installation of the colorimetric unit is inhibited;

the first conveyance member and the third conveyance member are arranged adjacent to each other respectively on an upstream side and the downstream side of the first image scanner which is located therebetween;

the third conveyance member and the second conveyance member are arranged adjacent to each other respectively on the upstream side and the downstream side of the second image scanner which is located therebetween;

the first conveyance member, the second conveyance member and the third conveyance member are set up such that the more downstream in the sheet conveying direction the conveyance member is located, the greater a speed of conveying the sheet is, and such that the more upstream in the sheet conveying direction the conveyance member is located in, the greater a force of conveying the sheet is, whereby (i) the first conveyance member conveys the sheet with a lesser speed and a greater force than the second conveyance member and the third conveyance member, (ii) the third conveyance member conveys the sheet with a greater speed and a lesser force than the first conveyance member and a lesser speed and a greater force than the second conveyance member, and (iii) the second conveyance member conveys the sheet with a greater speed and a lesser force than the first conveyance member and the third conveyance member; and each of the first conveyance member, the second conveyance member, and the third conveyance member comprises a pair of pressure rollers.

* * * * *